US011923186B2

(12) United States Patent
Groves et al.

(10) Patent No.: US 11,923,186 B2
(45) Date of Patent: Mar. 5, 2024

(54) TOOL FOR REPLACING OBSTRUCTED, UPWARD-FACING LIGHTBULBS

(71) Applicant: TBS Scientific LLC, Brighton, MI (US)

(72) Inventors: Brian Groves, Brighton, MI (US); Jorge Leon, Miami, FL (US)

(73) Assignee: TBS SCIENTIFIC LLC, Brighton, MI (US)

( * ) Notice: Subject to any disclaimer, the term of this patent is extended or adjusted under 35 U.S.C. 154(b) by 148 days.

(21) Appl. No.: 17/211,343

(22) Filed: Mar. 24, 2021

(65) Prior Publication Data

US 2021/0305038 A1 Sep. 30, 2021

Related U.S. Application Data

(60) Provisional application No. 62/993,893, filed on Mar. 24, 2020.

(51) Int. Cl.

| | |
|---|---|
| ***F21V 19/04*** | (2006.01) |
| ***B25B 9/00*** | (2006.01) |
| ***B25B 13/48*** | (2006.01) |
| ***H01K 3/32*** | (2006.01) |

(52) U.S. Cl.

CPC ................. *H01K 3/32* (2013.01); *B25B 9/00* (2013.01); *B25B 13/481* (2013.01); *F21V 19/04* (2013.01)

(58) Field of Classification Search

CPC ......... B25B 9/00; B25B 13/481; F21V 19/04; H01K 3/32; H01J 9/003; H01J 9/006

USPC .............................................. 81/53.11–53.12

See application file for complete search history.

(56) References Cited

U.S. PATENT DOCUMENTS

| | | | | |
|---|---|---|---|---|
| 558,573 A * | 4/1896 | Smith | H01K 3/32 | 81/53.12 |
| 2,681,822 A * | 6/1954 | Daniels | H01K 3/32 | 81/53.11 |
| 6,883,400 B2 * | 4/2005 | Sugano | H01K 3/32 | 81/53.11 |
| 7,665,782 B2 * | 2/2010 | Buzby | B25B 9/00 | 294/109 |
| 7,891,716 B2 * | 2/2011 | Orr | B25B 27/00 | 294/99.1 |
| 2014/0304949 A1 * | 10/2014 | Denton | B25G 1/102 | 16/430 |
| 2017/0239789 A1 * | 8/2017 | Sian | H01K 3/32 | |
| 2020/0156231 A1 * | 5/2020 | Ferris | B25C 5/15 | |

* cited by examiner

*Primary Examiner* — Lee D Wilson
*Assistant Examiner* — Sidney D Hohl
(74) *Attorney, Agent, or Firm* — Thomas P. Heed; Heed Law Group PLLC

(57) ABSTRACT

The present invention is a device for installing and removing partially obstructed, upward-facing lightbulbs. It is comprised of a gripping element, a weight, a flexible rotary shaft having two ends, and an extension pole having two ends. The gripping element, itself, is comprised of a hollow, three-dimensional gripping element body having an inner and outer surface and a plurality of flexible, tactile members. The hollow, three-dimensional gripping element body is open at one end and closed at the other. At the open end, the plurality of flexible, tactile members are arranged about a peripheral rim at the opening. When the device is placed over a lightbulb, the flexible, tactile members capture the lightbulb. Rotating the extension pole will cause the lightbulb to rotate.

14 Claims, 14 Drawing Sheets

TOOL FOR REPLACING OBSTRUCTED, UPWARD-FACING LIGHTBULBS

CROSS REFERENCE TO RELATED APPLICATIONS

The present application is a U.S. Nonprovisional Utility Patent Application claiming priority to U.S. Provisional Patent Application No. 62/993,893, filed Mar. 24, 2020, and entitled, "TOOL FOR REPLACING OBSTRUCTED, UPWARD-FACING LIGHTBULBS," which is incorporated herein by reference.

FIELD OF INVENTION

This invention relates to the classification for tools or bench devices not otherwise provided for, for fastening, connecting, disengaging, or holding. Specifically, this invention is a tool for replacing obstructed, upward-facing lightbulbs.

BACKGROUND OF INVENTION

Lightbulbs consist of an air-tight glass enclosure (the envelope, or bulb) with a filament of metal inside the bulb, through which an electric current is passed. Contact wires and a base with two (or more) conductors provide electrical connections to the filament. Incandescent lightbulbs usually contain a stem or glass mount anchored to the bulb's base that allows the electrical contacts to run through the envelope without air or gas leaks. The electrical contacts extend down to a conductive cap, which is connected to a lamp to power the bulb. Lamps have a screw base, also known as a socket, into which the cap is screwed. Thus, lightbulbs are screwed into and out of the screw base of lamps.

Lightbulbs come in a variety of different shapes and sizes. Light sockets are also available in a variety of configurations, such as recessed sockets, protruding sockets, and sockets that face downwards, upwards, to the side, etc. Often, individuals must use ladders to reach the lightbulbs for removal and installation. The ascending and descending of the ladder can be dangerous for the user, as the individual may fall while removing the lightbulb from the socket. As a consequence, various extension rods with grasping calipers have been developed to help in the removal of lightbulbs from high ceilings that aren't reachable from the ground.

Adding complexity to the situation is the removal of lightbulbs from orifices in which the sockets are both upward-facing and partially obstructed. For example, a chandelier will typically have a plurality of lightbulbs situated in sockets that are oriented upwards. The decorative elements of the chandelier will typically preclude removal from the side. The bulbs invariably need to be removed from the top. The bulbs in such fixtures are typically (1) elevated off the ground; (2) accessible only from the top; and (3) obstructed partially by the decorative elements of the fixture.

Many of these types of light fixtures use bulbs with candelabra bases, with a nominal base of 0.47". Some of them use bulbs with intermediate bases, with a nominal base of 0.54". The bulbs in a chandelier or other decorative light fixture containing a plurality of bulbs will usually have a conical (C), blunt (B), or conical angular (CA) shape. Bulbs also come in different sizes. A C9 bulb has a diameter of 1⅛". A C7 bulb has a diameter of ⅞". The number following the shape code refers to the maximum diameter of the bulb. Together, the shape, base, and size of a bulb will be referred to as the Bulb Type.

Therefore, a need exists to overcome the problems with the prior art as discussed above, and particularly for a more efficient way process of installing and removing B-, C-, and CA-shaped lightbulbs with candelabra or intermediate bases from upward-facing, partially obstructed lamp sockets, especially in locations and configurations that are difficult to reach.

SUMMARY OF THE INVENTION

The present invention is a device for installing and removing partially obstructed, upward-facing lightbulbs. This summary is intended to disclose a device specifically intended for installing and removing partially obstructed, upward-facing B-, C-, and CA-shaped lightbulbs with candelabra or intermediate bases. The teachings of this patent can, of course, be extended to other Bulb Types. However, most of the light fixtures that have a plurality of lightbulbs that are upward-facing and partially obstructed are those that use B-, C-, and CA-shaped lightbulbs with candelabra or intermediate bases. This summary is not intended to limit the claimed subject matter's scope.

A device for installing and removing partially obstructed, upward-facing lightbulbs comprises a gripping element, a weight, a flexible rotary shaft having two ends, and an extension pole having two ends. The gripping element, itself, is comprised of a hollow, three-dimensional gripping element body having an inner and outer surface and a plurality of flexible, tactile members. The hollow, three-dimensional gripping element body is open at one end and closed at the other. At the open end, there are a plurality of flexible, tactile members arranged about a peripheral rim at the opening. At the closed end is a connector to attach the gripping element to the flexible rotary shaft.

The hollow, three-dimensional gripping element body can be a prism, such as a rectangular prism, a pentagonal prism or a hexagonal prism. The hollow, three-dimensional gripping element body can also be a cylinder. In the embodiment containing a hollow, three-dimensional gripping element body constructed from a hexagonal prism, the outer surface is a hexagonal prism and the inner surface is a hexagonal prism. Likewise, if the hollow, three-dimensional gripping element body were constructed from a cylinder, the outer surface would be a cylinder and the inner surface would be a cylinder. The hollow, three-dimensional gripping element body is intended to hold a light-bulb while it is being installed and removed. Experience has shown that a hexagonal prism works best, because it allows the person replacing the lightbulbs to have a ready reference concerning the positioning and the orientation of the flexible, tactile members. The hollow, three-dimensional gripping element body has a top surface closing the volume at the end distal to the opening. The top surface can be the same shape as the side surfaces of the hollow, three-dimensional gripping element body, such as a disc fitting over a cylinder or a hexagon fitting over a hexagonal prism. The top surface can also be a different shape from the side surfaces of the hollow, three-dimensional gripping element body, such as a disc fitting over a hexagonal prism. The top surface has a connector for attaching the gripper element to the flexible, rotary shaft. The hollow, three-dimensional gripping element body can be constructed from one or more polymers and thermo-plastic elastomers, such as Thermoplastic Polyurethane ("TPU"), Thermoplastic copolyester ("TPC"), Acrylonitrile Butadiene Styrene ("ABS"), High Density Poly Ethylene ("HDPE"), Low Density Poly Ethylene ("LDPE"), Polypropylene ("PP"), and Polyethylene Terephthalate ("PET").

In the embodiments shown herein, there are three flexible, tactile members, which is the minimum needed to repeatedly and successfully grasp a lightbulb. The hexagonal prism is used for the hollow, three-dimensional gripping element body, so that there are exactly twice as many sides as there are flexible, tactile members. This provides an adequate visual cue for a ground-based person to position the present invention above a bulb.

Each of the plurality of flexible, tactile members has a base end, a tip end, a first edge, a second edge, an outer surface, and an inner surface. The base end is a rectangular cube. The inner surface is concave. A transition line between the base and the concave inner surface is discernible. The flexible, tactile members also have a height, a radius of curvature, and an angle of curvature. The angle of curvature is determined by extending a first line orthogonal to the edge at the transition line between the base and the concave inner surface and second line orthogonal to the edge at the tip, which is aimed at the first line, until the first and second line intersect. The length of these lines is the radius of curvature. The height is measured from the bottom of the base to the end of the tip.

A lightbulb will have a maximum diameter. For best results, the height of the flexible, tactile members should be sufficient so that the concave inner surface extends from the maximum diameter of the lightbulb to a point near the base of the lightbulb, without actually touching the base of the lightbulb.

The base of each of the flexible, tactile members is connected to the hollow, three-dimensional gripping element body around the periphery of the open end of the hollow, three-dimensional gripping element body. In one embodiment, the flexible, tactile members are permanently attached to the hollow, three-dimensional gripping element body.

In another embodiment, the flexible, tactile members are removable. In this embodiment, the base of each flexible, tactile members fits in a corresponding slot formed in a peripheral rim around the open end of the hollow, three-dimensional gripping element body. In this way, sets of flexible, tactile members can be used, with each set being designed to fit lightbulbs within a certain range of Bulb Types. For example, the height, size, and curvature of a set of flexible, tactile members can be adjusted so that the invention removes a C5 with a candelabra base. For example, to remove a C5 bulb with a candelabra base, the present invention might use relatively shorter flexible, tactile members, with a relatively shorter curvature radius, and a smaller curvature angle. These tips would be short but close together. A different set of flexible, tactile members would be needed to remove a B13 bulb with an intermediate base. The relative height, curvature radius, and angle of curvature would be increased so that the present invention can remove the largest types of lightbulbs with candelabra or intermediate bases.

The plurality of flexible, tactile members is fabricated from a polymer or thermoplastic elastomer such as polylactic acid ("PLA") or TPU. The gripping element and the inner surface of each of the plurality of flexible, tactile members are configured to make a force fit with particular range of Bulb Types. The flexible, tactile members will retain a lightbulb in the interior of the hollow, three-dimensional gripping element body of the gripping element.

Together, the weight and the gripping element combine for a weight-and-gripping-element assembly. In order for the present invention to work, the mass of the weight-and-gripping-element assembly must be sufficient to force the flexible, tactile members apart when the invention is lowered over a bulb. When the hollow, three-dimensional gripping element body is fabricated from one or more polymers and thermo-plastic elastomers, such as TPU, TPC, ABS, HDPE, LDPE, PP, and PET, the weight of the gripping element, alone, will be insufficient to force the flexible, tactile members apart when the invention is lowered over a bulb.

In one embodiment, additional weight may be integrally molded into the gripping element, creating a unitary weight-and-gripping-element assembly. The gripping element can be made heavier by adding material to the walls of the hollow, three-dimensional gripping element body and the top surface. Weight can also be added by insert molding metal slugs.

However, in practice, providing an additional, discrete weight has proven to be desirable. In one embodiment, the weight and gripping element are distinct from one another. In this embodiment, the weight has a cylindrical inner diameter through which the flexible rotary shaft extends. The discrete weight fits over the flexible, rotary shaft and is in contact with the top surface of the hollow, three-dimensional gripping element body in use. The weight may be metal, molded from a polymer, or be a combination of both. In order to protect against damage, the exterior of the weight may be foam. In a variation of this embodiment, the device for installing and removing lightbulbs further comprises a silicon tube disposed between the cylindrical inner diameter of the weight and the flexible rotary shaft. The silicon tube may be insert molded into the weight.

The flexible, rotary shaft is bent while in use. In practice, this means that the weight will not be directly over the center of the bulb. By manipulating the exact orientation of the weight with respect to the gripping element, the user is better able to force the flexible, tactile members apart and lower the present invention over the bulb.

The first end of the flexible rotary shaft is connected, directly or indirectly, to the first end of the extension pole. The second end of the flexible rotary shaft is attached directly or indirectly to the top surface of the gripping element.

The extension pole is continuously extensible between a fully compacted length and a fully extended length. As the extension pole is rotated at an angular rate, the flexible rotary shaft and the gripping element rotate at the same angular rate. In an alternative embodiment, the device for installing and removing partially obstructed, upward-facing lightbulbs further comprises a semi-annular collar fitted about the outer diameter of a portion of the extension pole. The semi-annular collar and the extension pole are free to be rotated independently of one another. When the semi-annular collar is held in a non-rotational manner, the extension pole may be rotated at an angular rate, causing the flexible, rotary shaft and the gripping element to rotate at the same angular rate as the extension pole, without slippage.

In one embodiment, the device further comprises an adapter. The adapter is interposed between the extension pole and the flexible rotary shaft. In this embodiment, the first end of the extension pole has a threaded termination and the adapter has a threaded receptacle to receive the threaded termination at the first end of the extension pole. The flexible rotary shaft is attached to the adapter. When the handle of the extension pole is rotated at an angular rate, the adapter and flexible rotary shaft rotate at the same rate. In one embodiment, the adapter is fabricated from nylon, which is at least one of an aliphatic polyamide, a semi-aromatic polyamides, a glass-filled aliphatic polyamide, and a glass-filled semi-aromatic polyamide.

When a user uses the device for installing and removing partially obstructed, upward-facing lightbulbs, the user grasps the semi-annular collar with one hand and the extension pole with the other hand. When the device is lowered over a lightbulb with an appropriate Bulb Type, the downward gravitational force on the mass of the device allows the lightbulb to separate the flexible, tactile members. The flexible, tactile members will separate sufficiently to allow the lightbulb to pass through and seat in the hollow, three-dimensional gripping element body. With the device seated over a lightbulb, the flexible, tactile members provide sufficient friction that the lightbulb may be rotated at the same angular rate as the extension pole, when the extension pole is rotated. By rotating the extension pole in a counter-clockwise direction, the lightbulb may be removed. Likewise, a lightbulb may be placed in a socket by placing the lightbulb into the hollow, three-dimensional gripping element body, lowering the gripping element over a socket, engaging the base of the lightbulb into the socket, and rotating the extension pole in a clockwise direction until the lightbulb is fully engaged in the socket.

DESCRIPTION OF THE DRAWINGS

The present invention is illustrated with 15 figures on 14 sheets. The accompanying drawings, which are incorporated in and constitute a part of this disclosure, illustrate various example embodiments.

In the drawings.

DETAILED DESCRIPTION

This detailed description discloses the present invention 1, a device for installing and removing partially obstructed, upward-facing lightbulbs 1. The following descriptions are not meant to limit the invention, but rather to add to the summary of invention, and illustrate the present invention, by offering and illustrating various embodiments. While embodiments of the invention are illustrated and described, the embodiments herein do not represent all possible forms of the invention. Rather, the descriptions, illustrations, and embodiments are intended to teach and inform one skilled in the art without limiting the scope of the invention. When discussing the same or similar structures a common number will be used.

Figure 9A:
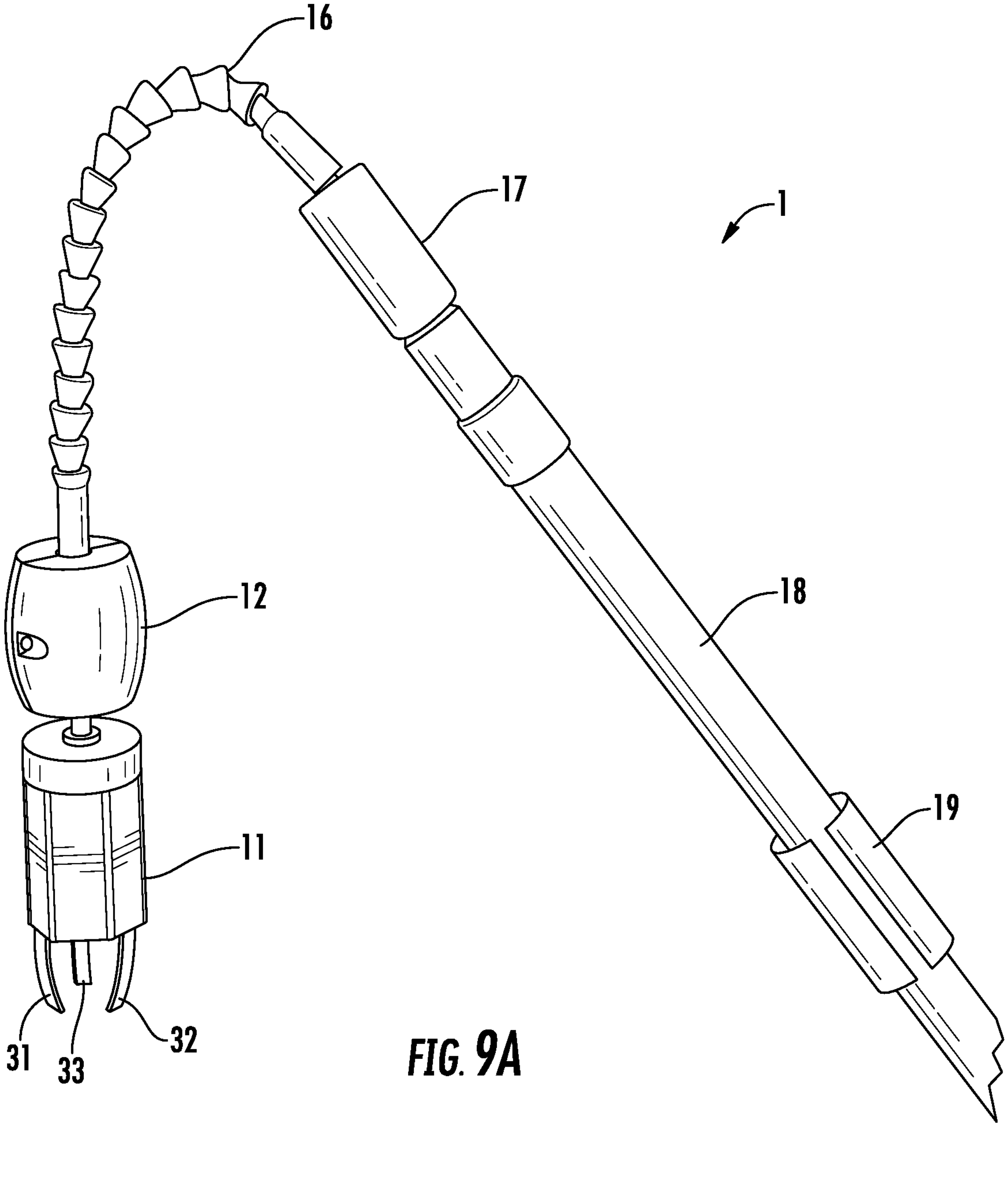
FIGS. 9A-B are perspective views of two embodiments of a device for installing and removing partially obstructed, upward-facing lightbulbs.
Figure 9B:
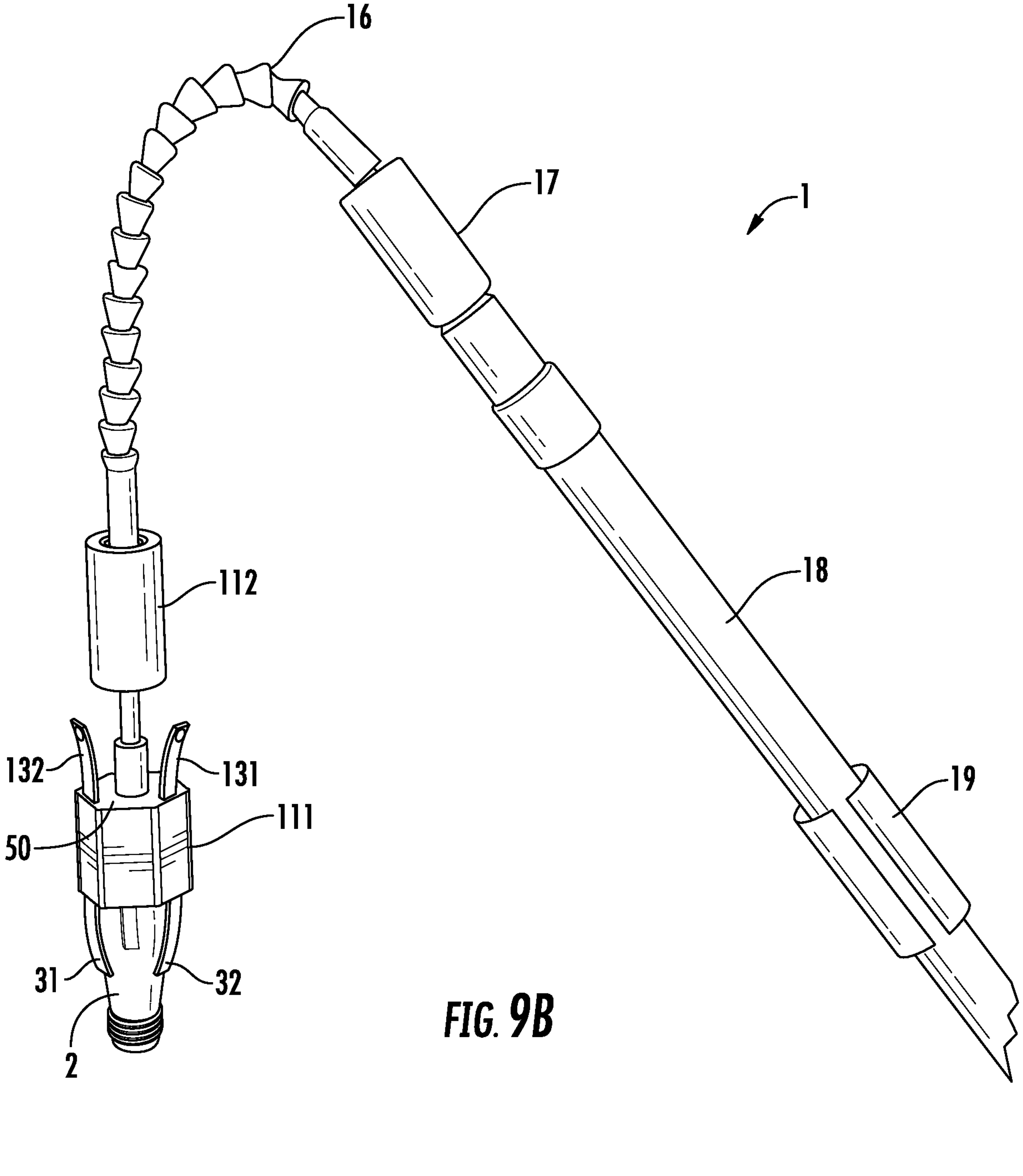

FIGS. 9A-B show two embodiments of the present invention 1, a device for installing and removing partially obstructed, upward-facing lightbulbs 1. In FIG. 9A, the device for installing and removing partially obstructed, upward-facing lightbulbs 1 comprises an extension pole 18; a semi-annular collar 19 about the extension pole 18; a flexible, rotary shaft 16; a weight 12, and a gripping element 11 with a plurality of flexible, tactile members 31, 32, 33. Also shown is an adapter 17 that may be required to connect a flexible, rotary shaft 16 to the extension pole 18. The gripping element 11 is shown with a hollow, three-dimensional gripping element body 11, and a plurality of flexible, tactile members 31, 32, 33. In this embodiment, there are three flexible, tactile members 31, 32, 33. Detail about this particular embodiment of the gripping element 11 will be discussed, below, in reference to FIGS. 1-2.

In FIG. 9B, the device for installing and removing partially obstructed, upward-facing lightbulbs 1 comprises an extension pole 18; a semi-annular collar 19 about the extension pole 18; a flexible, rotary shaft 16; a weight 112, and a gripping element 111 with a plurality of flexible, tactile members 31, 32 which are gripping a lightbulb 2. Also shown is an adapter 17 that may be required to connect a flexible, rotary shaft 16 to the extension pole 18. The gripping element 111 is shown with a hollow, three-dimensional gripping element body 111, a first plurality of flexible, tactile members 31, 32 installed to retain a lightbulb 2, and a second plurality of flexible, tactile members 131, 132 that are being stored in slots in the top surface 50 of the hollow, three-dimensional gripping element body 111. Detail about this particular embodiment of the gripping element 111 will be discussed, below, in reference to FIGS. 11-15.

Figure 10:
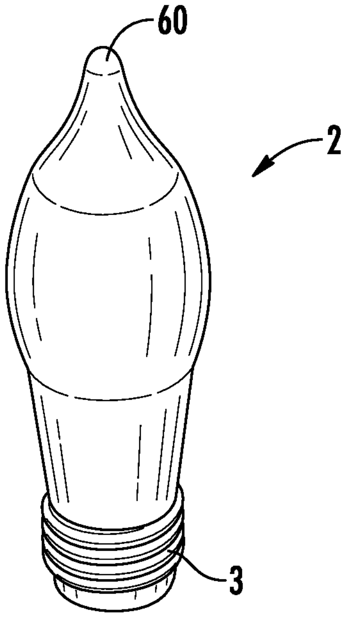
FIG. 10 is a perspective view of a C-shaped lightbulb.

FIG. 10 shows a C-Shaped lightbulb 2 having an intermediate base 3 and a tip 60.

In one embodiment of the present invention 1, additional weight may be integrally molded into the gripping element 11, 111, creating a unitary weight-and-gripping-element assembly. The gripping element 11, 111 can be made heavier by adding material to the walls of the hollow, three-dimensional gripping element body 11, 111 and the top surface 50. Weight can also be added by insert molding metal slugs.

Figure 4A:
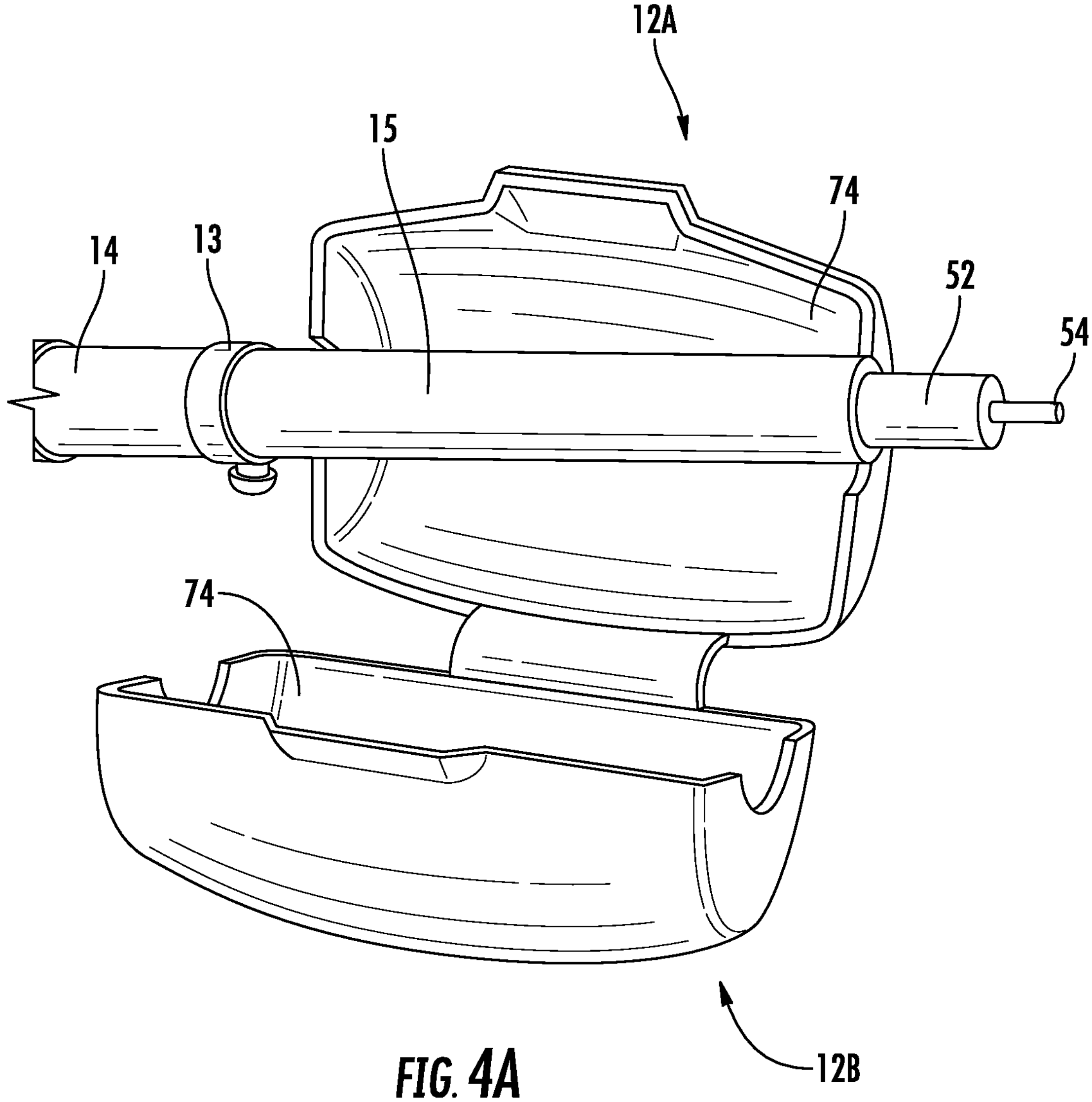
FIG. 4A is a perspective side view of a discrete, two-part weight, with the two parts separated.
Figure 4B:
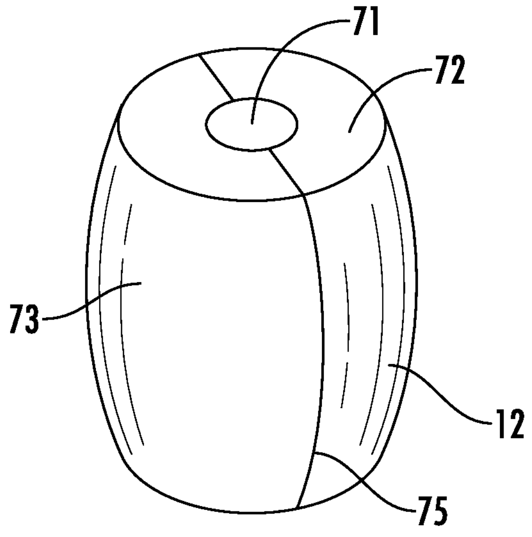
FIG. 4B is a perspective view of a discrete, two-part weight with the two parts together.
Figure 4C:
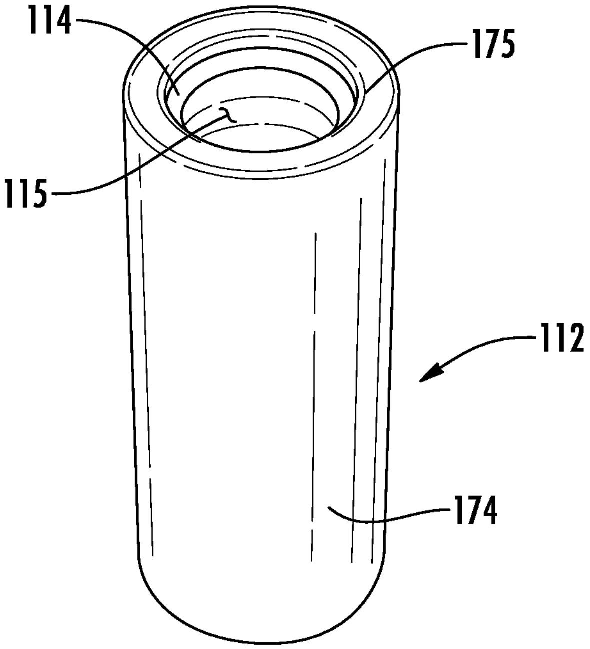
FIG. 4C is a perspective view of alternative embodiment of a discrete weight.

However, in practice, providing an additional, discrete weight 12, 112 has proven to be desirable. FIGS. 4A-C disclose embodiments of a discrete weight 12, 112. FIGS. 4A-B show a two-piece discrete weight 12A, 12B. The discrete weight 12 has an inside 74 and a two piece outside 72, 73. The two-piece outside 72, 73 has a parting line 75. An opening 71 allows the flexible, rotary shaft 16 to pass through the discrete weight 12. A silicone tube 14, 15 is bisected by a collar 13, allowing the flexible, rotary shaft 16 to be unencumbered. The collar 13 on the silicon tube 14, 15 prevents the weight from travelling too far up the flexible, rotary shaft 16 if the present invention 1 is inverted. Also visible is the connector end 52, 54 of the rotary shaft 16 intended to mate with the gripping element 11, 111. The interior 74 of the discrete 12 weight can be filled with shot or slugs to get the correct weight through trial and error.

In FIG. 4C, a fixed discrete weight 112 is shown. This discrete weight 112 has a metal cylinder 114 with a hollow center 115. The flexible, rotary shaft 16 fits through the hollow center 115. This discrete weight 112 has an exterior surface 174 made from foam. The foam rim 175 extends further than the metal cylinder 114 in order to minimize damage as the discrete weight 112 slides.

A discrete weight 12, 112 has a cylindrical inner diameter through which the flexible rotary shaft 16 extends. The discrete weight 12, 112 fits over the flexible, rotary shaft 16 and is in contact with the top surface 50 of the hollow, three-dimensional gripping element body 11, 111 when in use. The discrete weight 12, 112 may be metal, molded from a polymer, or be a combination of both. It may be a fixed weight 112 or it may allow for shot or slugs to be added 12. In order to protect against damage, the exterior of the discrete weight 12 may be foam 174.

Figure 5A:
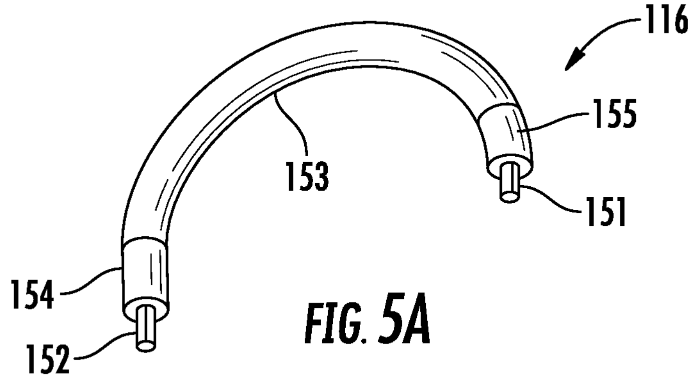
FIGS. 5A-B are perspective views of two different embodiments of a flexible, rotary shaft.
Figure 5B:
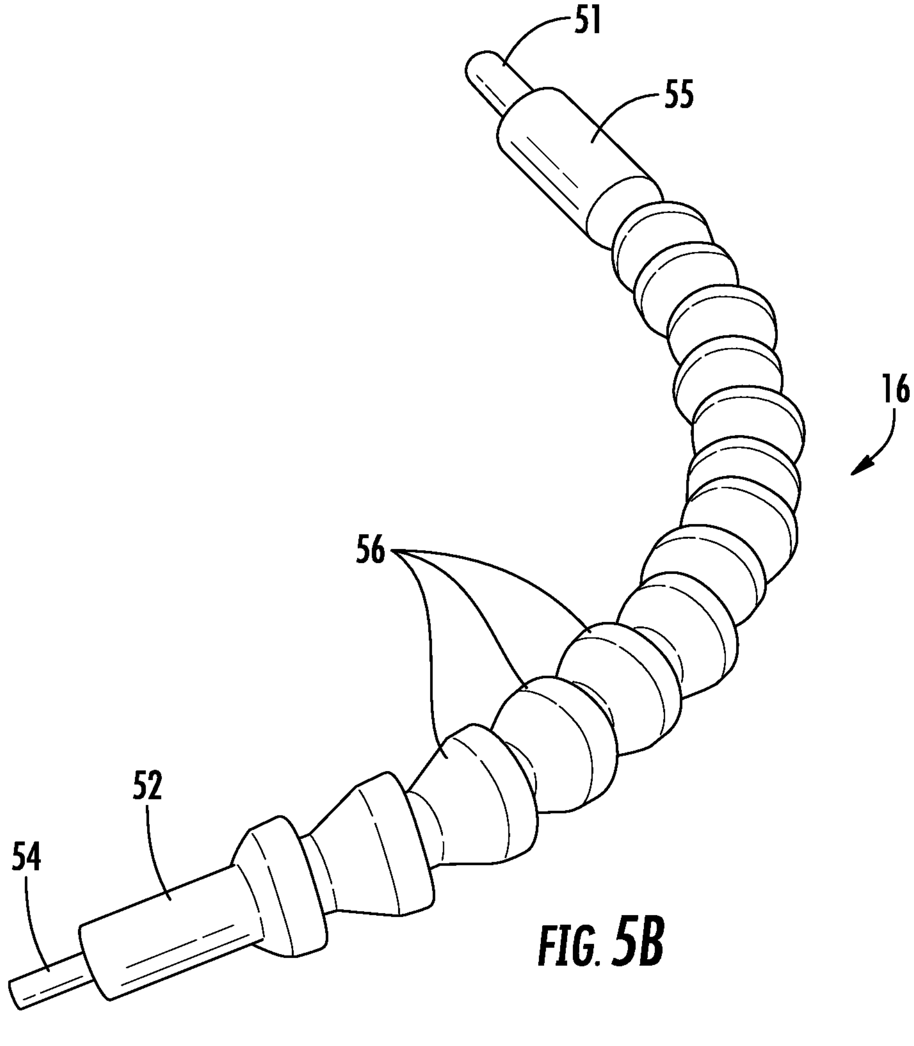

FIGS. 5A-B show two embodiments of a flexible, rotary shaft 16, 116. FIG. 5A shows a flexible, rotary shaft 116 comprised of a flexible cable 153 with aglets 155, 154 and connectors 152, 151, at each end. FIG. 5B shows a flexible, rotary shaft 16 comprised of a plurality of triangular-shaped bearing elements 56. In this embodiment, the plurality of triangular-shaped bearing elements 56 are axially fixed with respect to one another, meaning that they cannot rotate independent of one another. At each end of the flexible, rotary shaft 16 are fittings 52, 55, and connectors 51, 54. At one end, the flexible, rotary shaft 16, 116 connects to the top of the hollow, three-dimensional gripping element body 11, 111. At the other end, the flexible, rotary shaft 16, 116 connects, directly or indirectly, with the extension pole 18.

Figure 6:
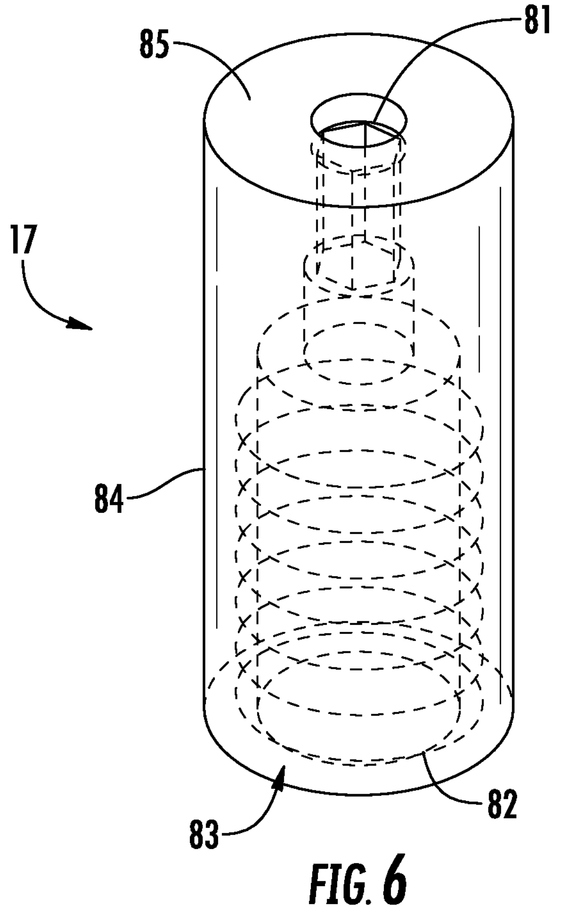
FIG. 6 is a perspective view of an adapter for connecting the flexible, rotary shaft to the extension pole.
Figure 7:
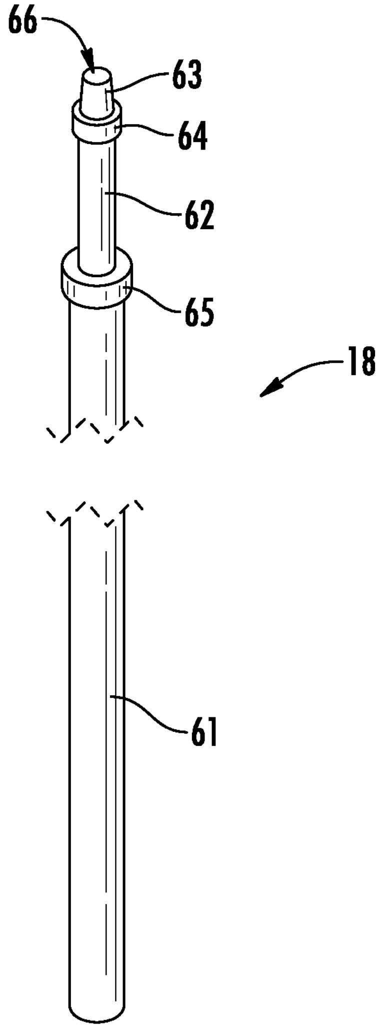
FIG. 7 is a perspective view of an extension pole.

Referring to FIGS. 6-7, an optional adapter 17 is provided in this disclosure to connect the flexible, rotary shaft 16, 116 to the extension pole 18. The adapter 17 is needed if the connector 66 on the end of the extension pole 18 does not mate with the connector 51, 54, 151, 152 at the end of the flexible, rotary shaft 16. The adapter 17 has an exterior surface 84, a top surface 85, and a bottom surface 83. In the top surface is a hole 81 that provides connection to the connector 51, 54, 151, 152 at the end of the flexible, rotary shaft 16, 116. In the bottom surface is a hole 82 that provides connection to the connector 66 at the end of the extension pole 18.

The extension pole 18 has a plurality of extensible segments 61, 62, 63. Retaining rings 64, 65 lock the extensible segments 61, 62, 63 in place relative to one another 61, 62, 63.

Figure 8:
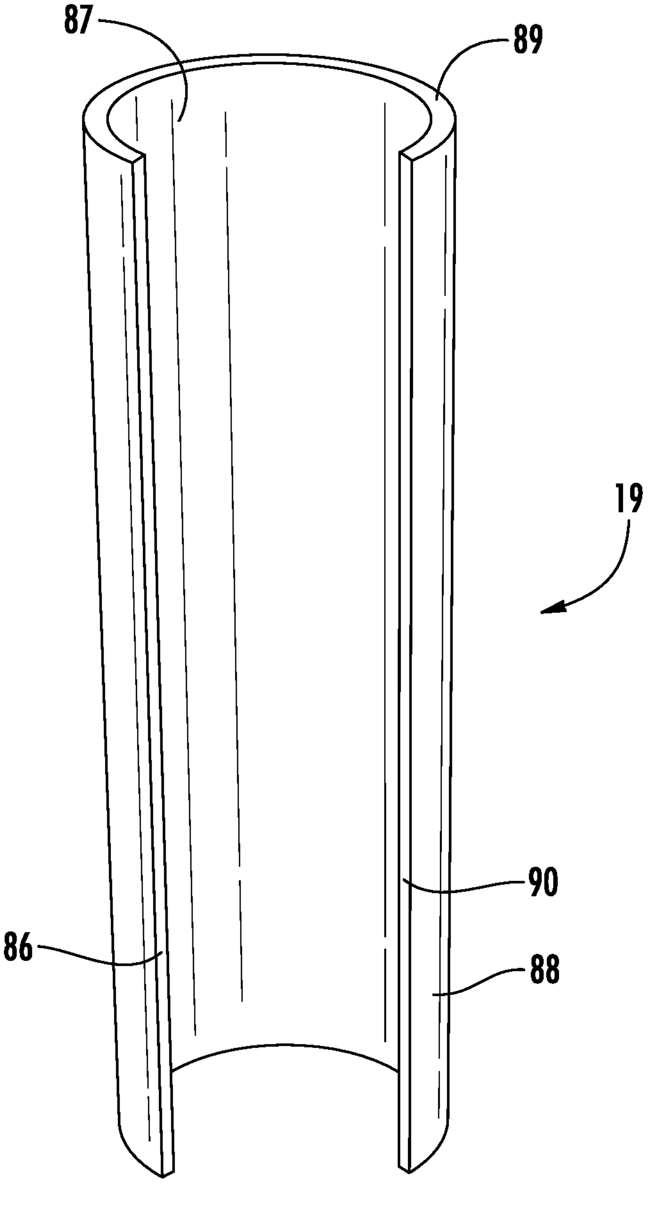
FIG. 8 is a perspective view of a semi-annular collar.

FIG. 8 shows a semi-annular collar 19 that fits over the largest extensible segment 61 of the extension pole 18. A user can more easily rotate the present invention by holding the semi-annular collar 19 fixed with one hand while rotating the extension pole 18 with the other hand. The semi-annular collar 19 has an inner surface 87, an outer surface 88, a top edge 89, a bottom edge (not shown), and two lateral edges 86, 90. The semi-annular collar 19 is attached to the extension pole 18 by aligning the two lateral edges 86, 90 with the extension pole and pressing.

Figure 1:
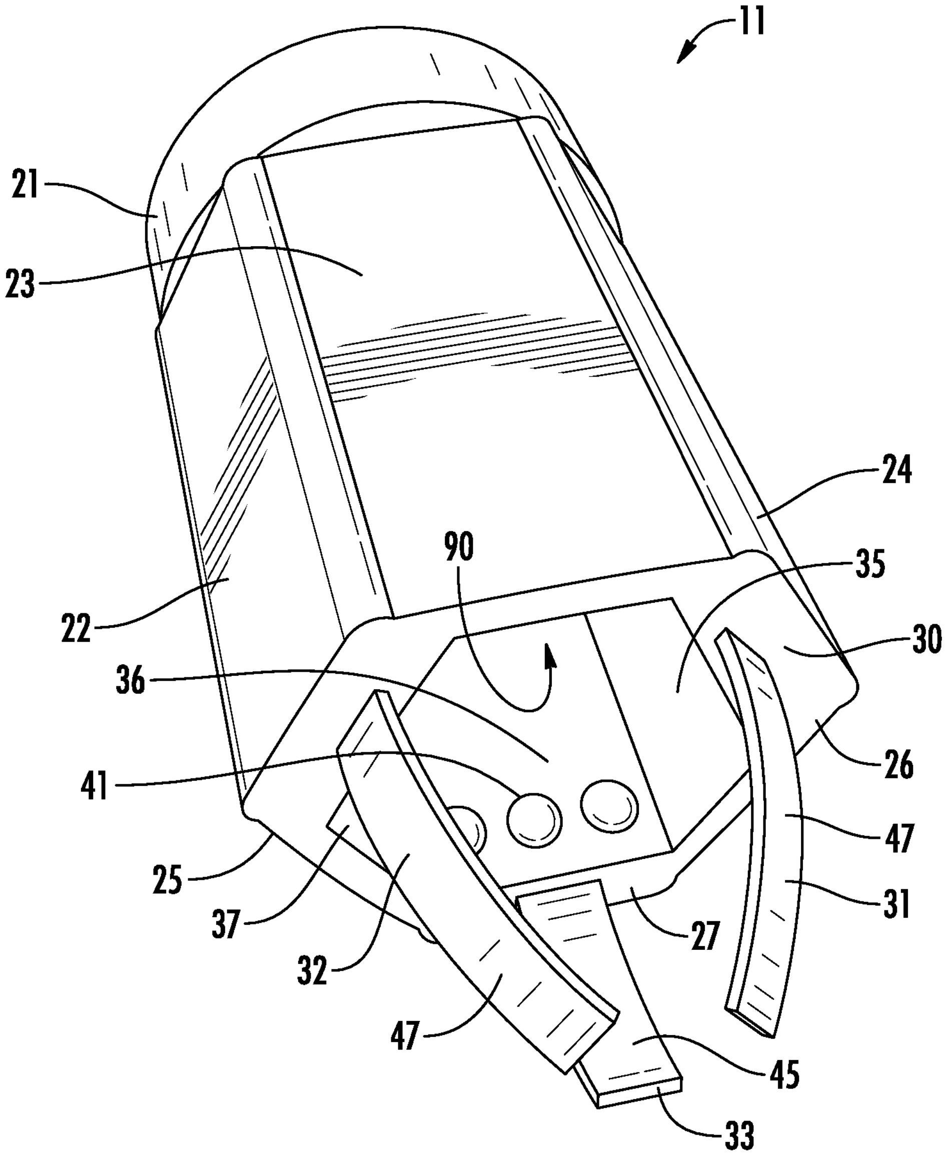
FIG. 1 depicts is a perspective view of a first embodiment of a gripping element.
Figure 2:
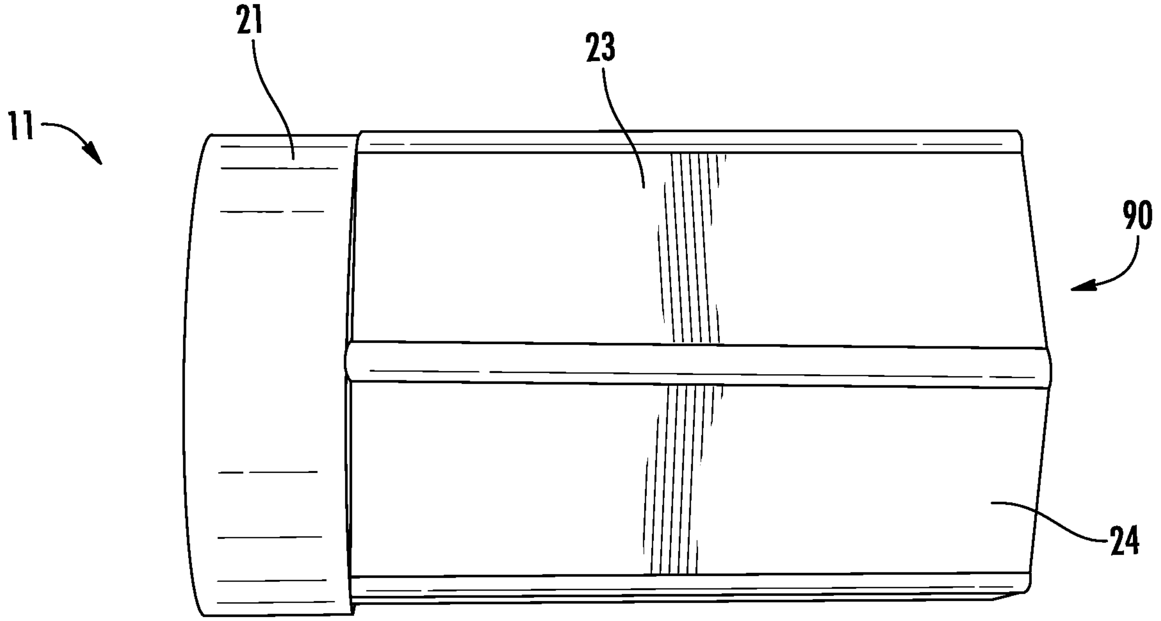
FIG. 2 is a side view of a first embodiment of a gripping element.

In FIGS. 1-2, a first embodiment of the gripping element 11 is shown, having a hollow, three-dimensional gripping element body 111 comprised of solid cylinder 21 on top of a hexagonal prism 22, 23, 24, 25, 26, 27. The hexagonal prism 22, 23, 24, 25, 26, 27 has six segments 22, 23, 24, 25, 26, 27. The six segments 22, 23, 24, 25, 26, 27, each have an outer surface 22, 23, 24, 25, 26, 27 and an inner surface 35, 36, 37 (due to the view some of the inner surfaces are not visible), The hexagonal prism 22, 23, 24, 25, 26, 27 is hollow, having an opening 90 with a peripheral rim 30. A plurality of flexible, tactile members 31, 32, 33 are installed. The inner surface 36 in proximity to the flexible, tactile members 33 is textured with dimples 141.

In FIGS. 11-15, a second embodiment of the gripping element 111 is shown having a hollow, three-dimensional gripping element body 111 comprised of hexagonal prism 130, 134, 137, 138, 136, 135 and a plurality of flexible, tactile members 31, 32, 33. The hexagonal prism 130, 134, 137, 138, 136, 135 has an outer surface 164, 165, 166, 167 with six sides (not all are visible in a single view) and an inner surface 180, 181 with six sides (not all are visible in a single view).

Figure 11:
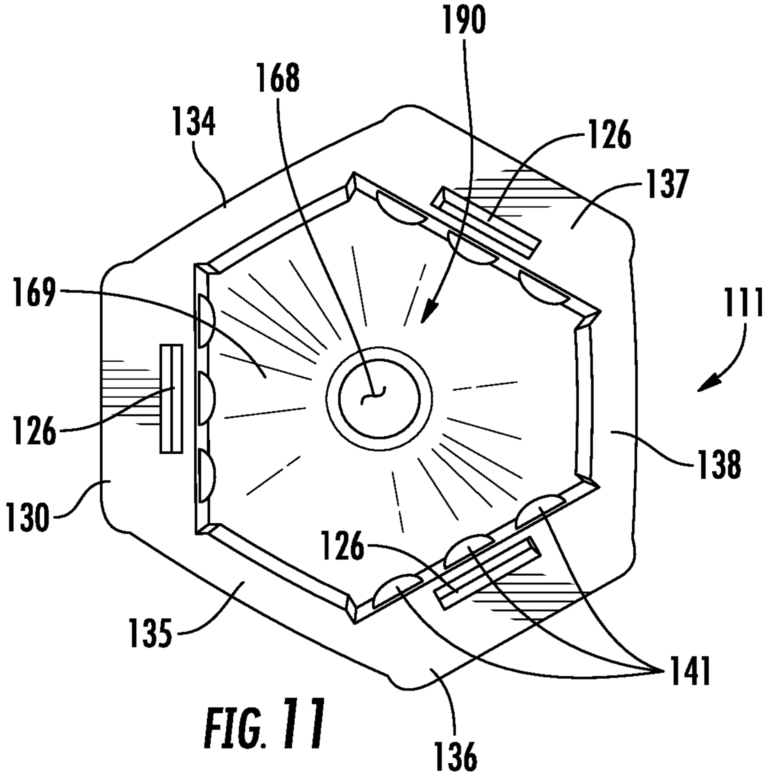
FIG. 11 is an end view of a second embodiment of the gripping element.
Figure 12:
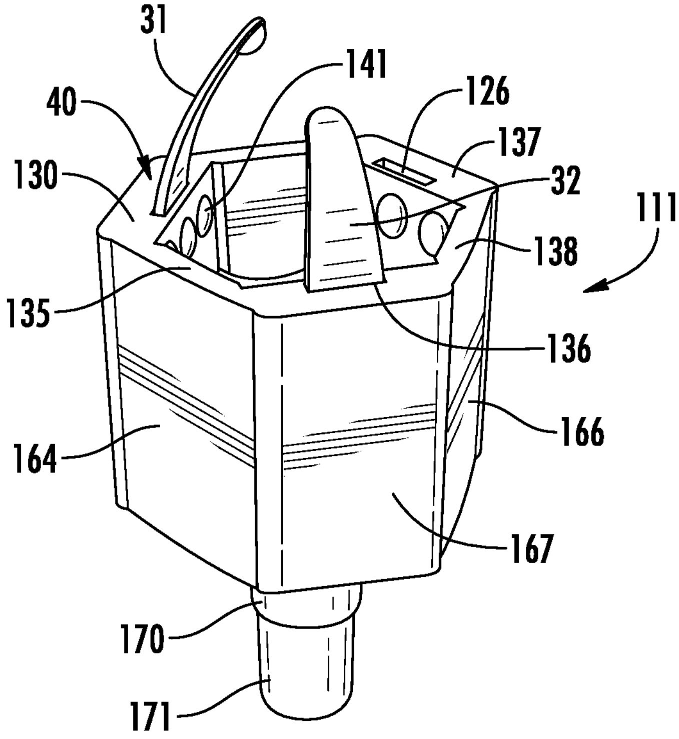
FIG. 12 is a perspective view of the second embodiment of the gripping element.

In FIGS. 11 and 12, a slot 126 into which the base 42 (see FIG. 3A) of the flexible, tactile members 31, 32 fit is visible. The slots 126 are formed in the peripheral rim 40 surrounding the opening 190 of the hollow, three-dimensional gripping element body 111.

In FIG. 11, at the apex of the inner surface is a cylindrical opening 168 into which the tip 60 of a B-, C-, or CA-Shaped lightbulb fits.

In FIG. 12, the outer cylindrical surface 170 of the opening 168 for the tip 60 of the bulb 2 is visible. On the flat portion of the inner surface 180, 181, in proximity to the slot 126 and/or the flexible, tactile members 31, 32 are a plurality of dimples 141 that retain the bulb 2. The external surface of the connector 171 for the flexible, rotary shaft 16 is also shown in FIG. 12.

Figure 13:
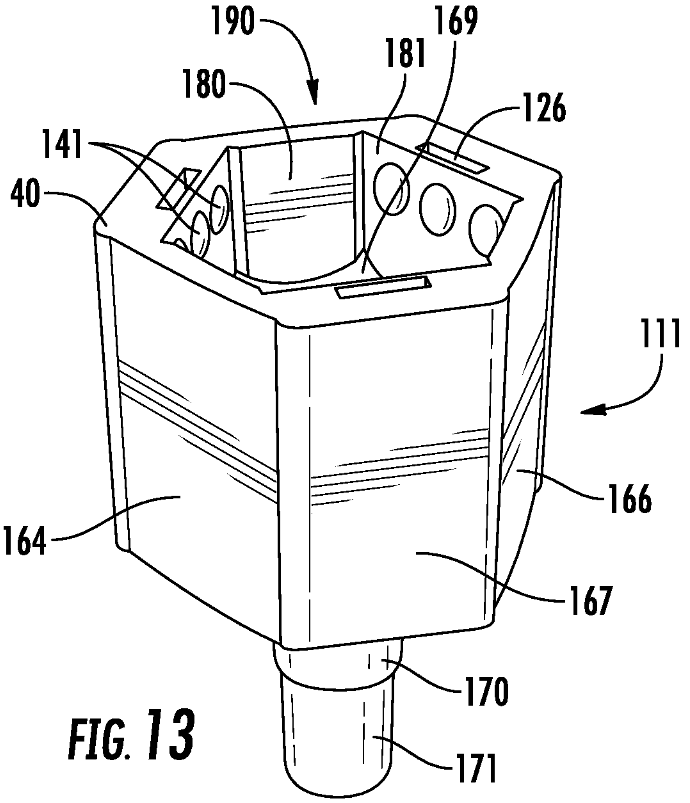
FIG. 13 is a perspective view of the second embodiment of the gripping element with the flexible, tactile members removed.

In FIGS. 11 and 13, the opening 190 of the hollow, three-dimensional gripping element body 111 is visible. In these views, the inner shape of the hollow, three-dimensional gripping element body 111 is discernible. The inner surface has six flat sides 180, 181 (not all of the six sides are visible in a single view) that transitions to a conical shaped surface 169.

Figure 14:
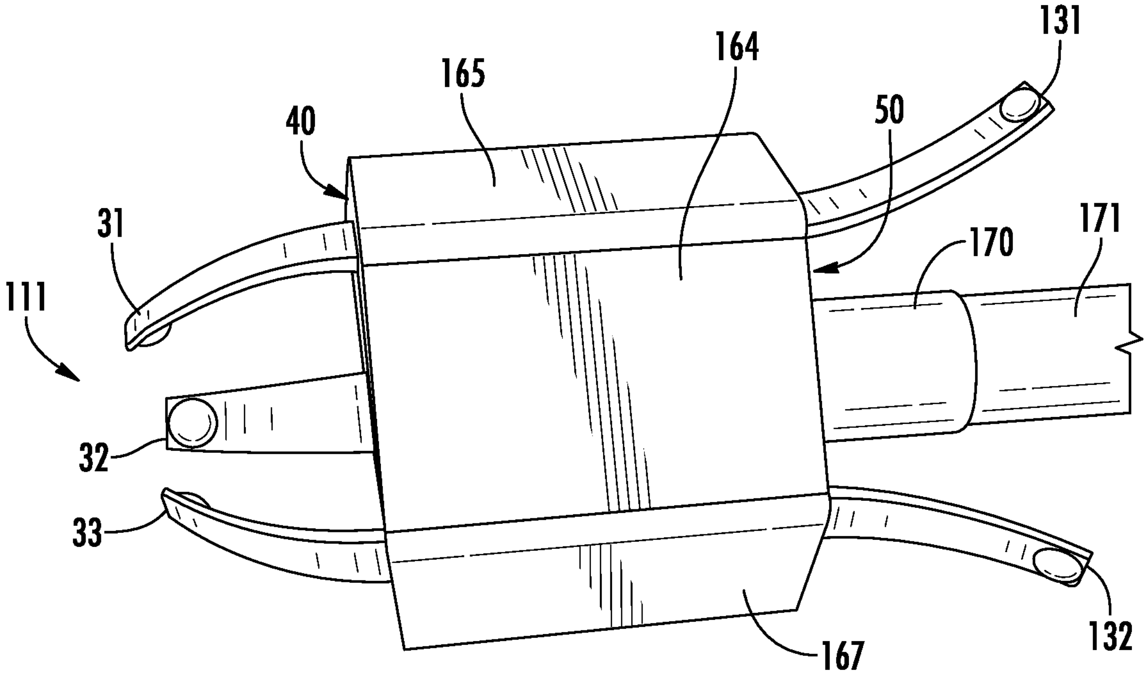
FIG. 14 is a side view of the second embodiment of the gripping element with a first set of flexible, tactile members installed in slots in the peripheral rim of the open end of the hollow, three-dimensional gripping element body and a second set of flexible, tactile members being stored in slots in the top surface of the hollow, three-dimensional gripping element body.

In FIG. 14, the gripping element 111 with two sets of flexible, tactile members 31, 32, 33, 131, 132, 133 is visible. A first plurality of flexible, tactile members 31, 32, 33 is installed into the slots 126 in the peripheral edge 40. A second plurality of flexible, tactile members 131, 132, 133 is installed into the slots 126 in the top surface 50 of the hollow, three-dimensional gripping element body 111.

Figure 15:
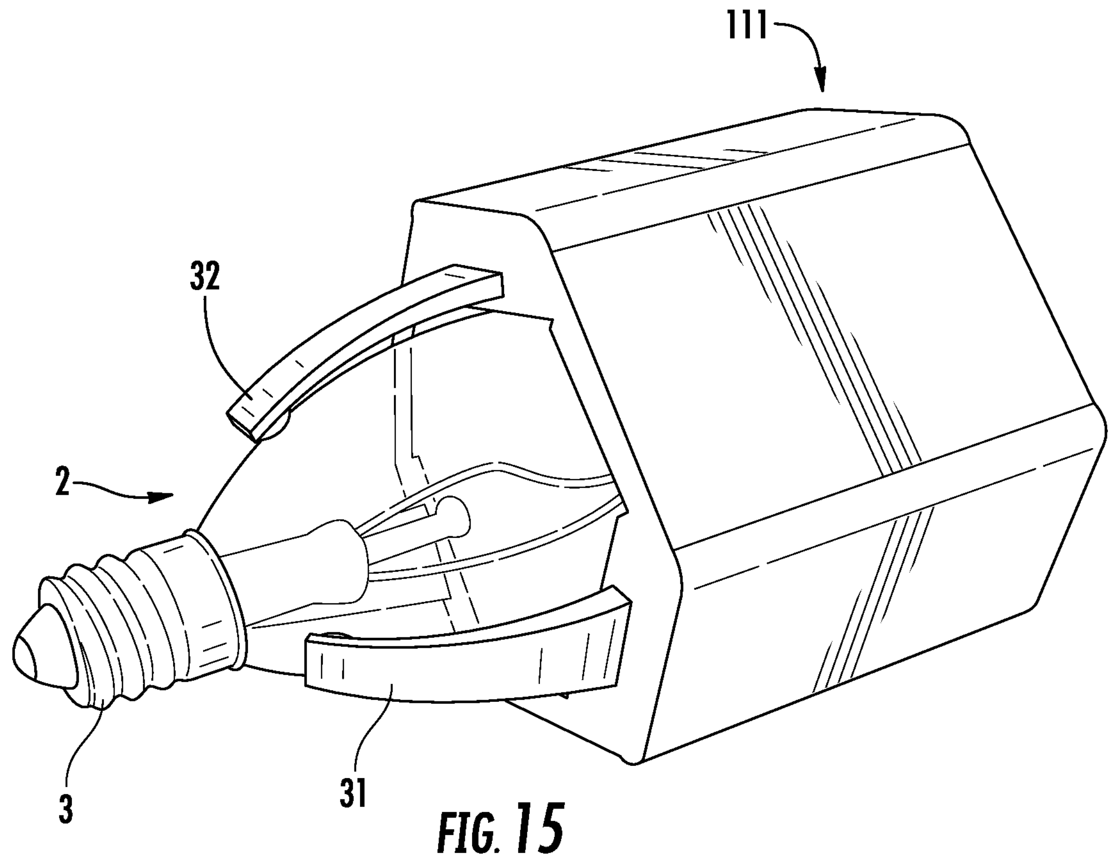
FIG. 15 is a perspective view of the C-shaped lightbulb in the second embodiment of the gripping element.

In FIG. 15, a C-Shaped lightbulb 2 having an intermediate base 3 and a tip 60 is retained in the interior of a hollow, three-dimensional gripping element body 111 by a plurality of flexible, tactile members 31, 32, 33.

Figure 3B:
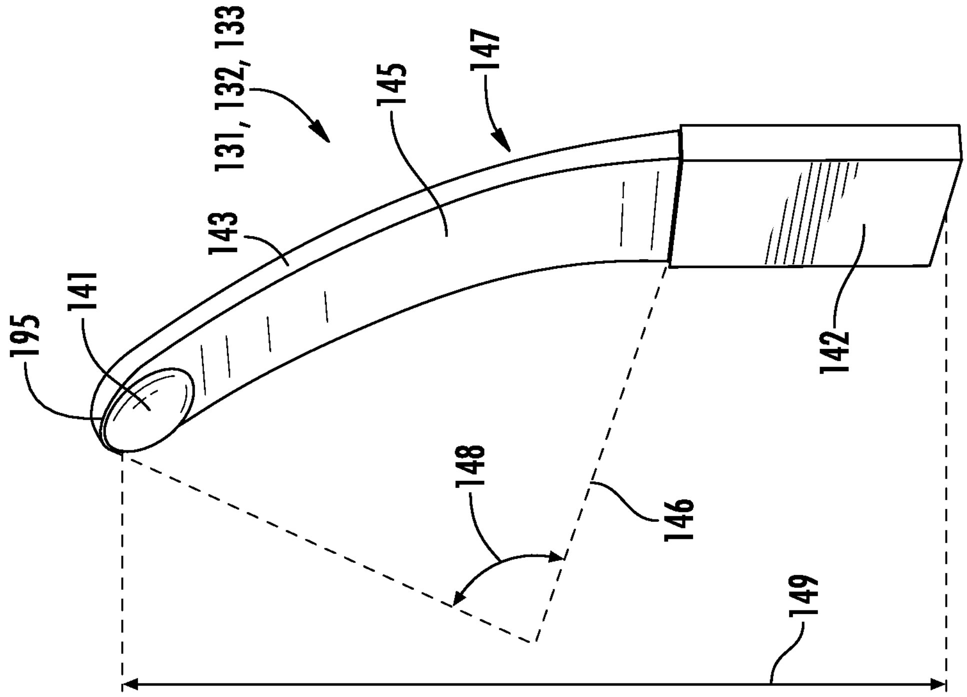
FIGS. 3A-C are perspective views of three different embodiments of the flexible, tactile member.
Figure 3A:
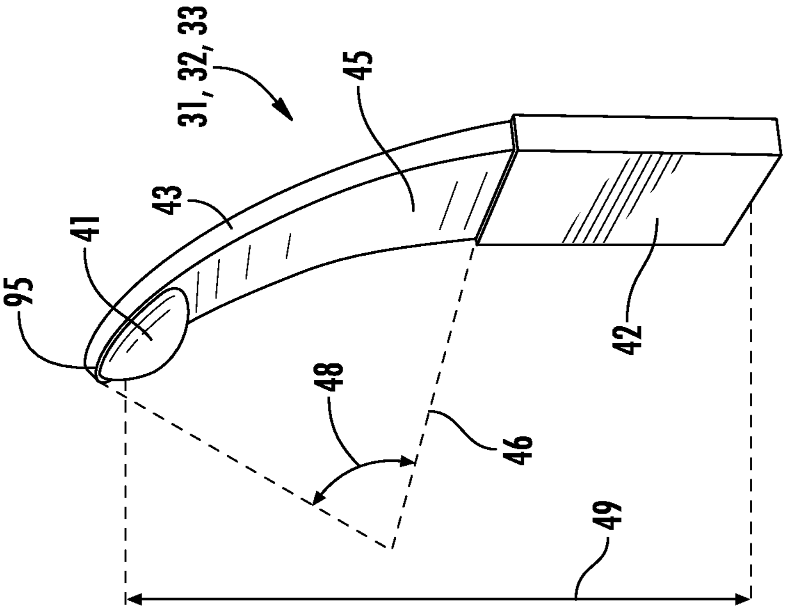
Figure 3C:
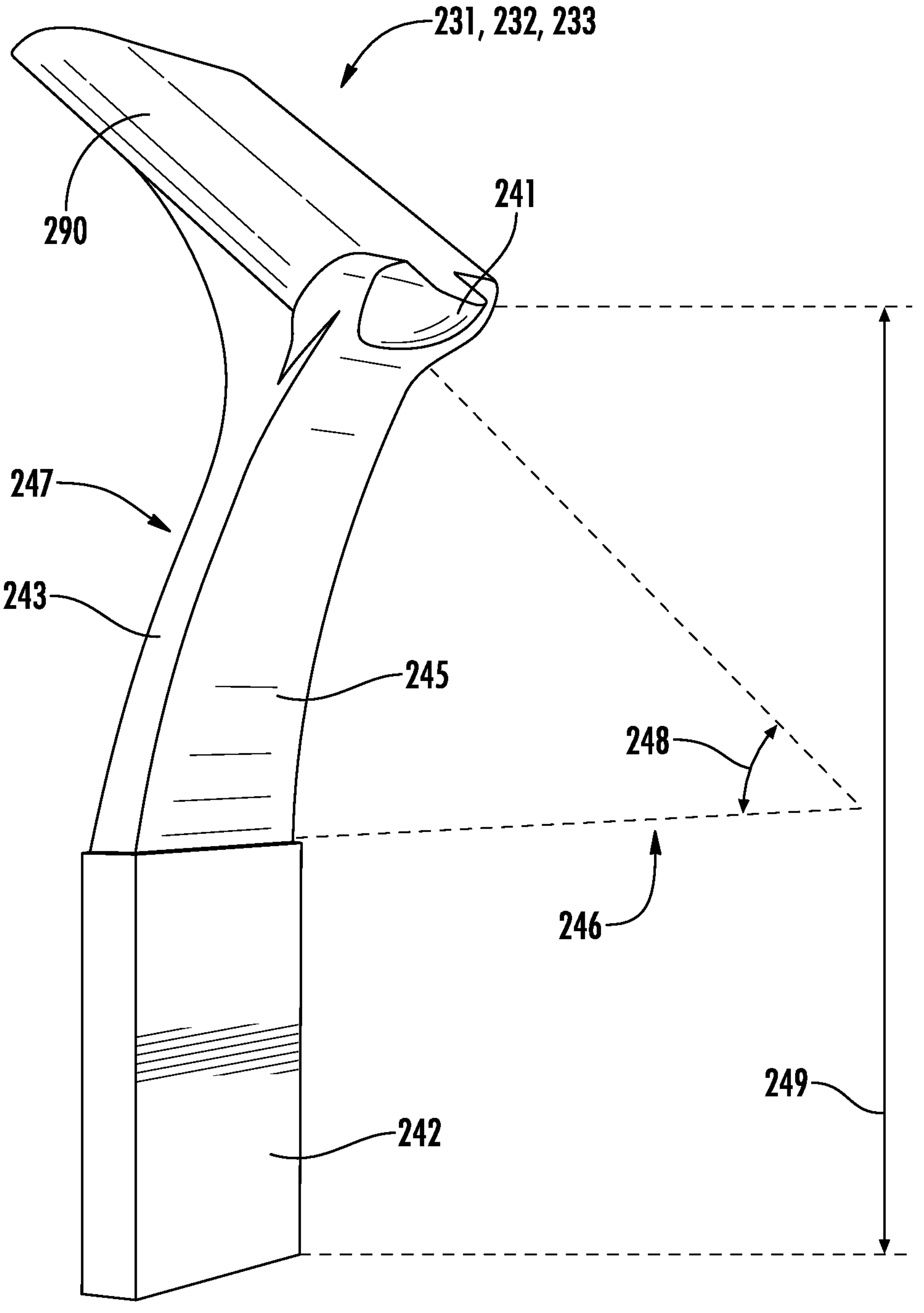

FIGS. 3A-C show three embodiments of flexible, tactile members 31, 32, 33 (FIG. 3A); 131, 132, 133 (FIG. 3B); and 231, 232, 233 (FIG. 3C). Referring to FIG. 3A, the flexible, tactile members 31, 32, 33 have a concave inner surface 45, a convex outer surface 47 (shown in FIG. 1), a base 42, a side edge 43, a tip 95, and a dimple 41 located near the tip 95. The flexible, tactile members 31, 32, 33 is characterized by three dimensions: a curvature radius 46, a curvature angle 48, and a height 49.

FIG. 3B discloses relatively taller flexible, tactile members 131, 132, 133 when compared to the flexible, tactile members 31, 32, 33 of FIG. 3A. The flexible, tactile members 131, 132, 133 in FIG. 3B have a concave inner surface 145, a convex outer surface 147, a base 142, a side edge 143, a tip 195, and a dimple 141 located near the tip 195. This flexible, tactile member 131, 132, 133 is also characterized by three dimensions: a curvature radius 146, a curvature angle 148, and a height 149.

FIG. 3C discloses an alternative embodiment of the flexible, tactile members 231, 232, 233. The flexible, tactile members 231, 232, 233 in FIG. 3C has a concave inner surface 245, a convex outer surface 247, a base 242, a side edge 243, a tip 295, a dimple 241 located near the tip 295, and a small counterbalance 290. The small counterbalance 290 adds mass, and therefore, a retention force due to gravity, to the flexible, tactile members 231, 232, 233. This flexible, tactile member 231, 232, 233 is also characterized by three dimensions: a curvature radius 246, a curvature angle 248, and a height 249.

The base 42, 142, 242 is a rectangular prism. A transition line is definable between the base 42, 142, 242 and the concave inner surface 45, 145, 245. The angle of curvature 46, 146, 246 is determined by extending a first line orthogonal to the edge 43, 143, 243 at the transition line between the base 42, 142, 242 and the concave inner surface 45, 145, 245 and second line orthogonal to the edge 43, 143, 243 at the tip 95, 195, 295, which is aimed at the first line, until the first and second line intersect. A constraint is that the first and second line are the same length. The length of these lines is the radius of curvature 46, 146, 246. The height 49, 149, 249 is measured from the bottom of the base 42, 142, 242 to the end of the tip 95, 195, 295.

The flexible, tactile members 31, 32, 33, 131, 132, 133, 231, 232, 233 are fabricated from a polymer or thermoplastic elastomer such as polylactic acid ("PLA") or TPU.

A lightbulb 2 will have a maximum diameter. For most Bulb Types, such as a C7, the numeric portion of the Bulb Type designation gives the maximum diameter in ⅛". So a C7 bulb has a maximum diameter of ⅞". A C9 bulb has a maximum diameter of 1⅛". For best results, the height 49, 149, 249 of the flexible, tactile members 31, 131, 231 should be sufficient so that the concave inner surface 45, 145, 245 extends from the maximum diameter of the lightbulb 2 to a point near the base 3 of the lightbulb 2, without actually touching the base 3 of the lightbulb 2 (See FIGS. 10 and 15).

Also, the larger the diameter of the bulb, the more curvature is needed for the flexible, tactile members 31, 131, 231. A relatively straight flexible, tactile members 31, 131, 231 will have a large radius of curvature 46, 146, 246 and a small angle of curvature 46, 146, 246. A highly curved flexible, tactile members 31, 131, 231 will have a relatively small radius of curvature 46, 146, 246 and a relatively large angle of curvature 46, 146, 246. Using height 49, 149, 249, radius of curvature 46, 146, 246, and angle of curvature 46, 146, 246, a flexible, tactile member 31, 131, 231 may be configured to capture a range of specific Bulb Types, by creating a force fit with the lightbulb 2 when the lightbulb 2 is in the hollow, three-dimensional gripping element body 11, 111.

The interplay between the flexible, rotary shaft 16, 116, the weight 12, 112, and the gripping element 11, 111 is critical. The combined mass of the weight 12, 112, and the gripping element 11, 111 and the length and stiffness of the flexible, rotary shaft 16, 116 dictate the orientation of the gripping element 11, 111 in use. The peripheral rim 40 surrounding the opening 190 of the hollow, three-dimensional gripping element body 111 defines a plane opening. The plane containing the peripheral rim 40 surrounding the opening 190 of the hollow, three-dimensional gripping element body 111 should be parallel to the ground, regardless of the angle at which the extension pole 18 is held. When the extension pole is held horizontal, the plane containing the peripheral rim 40 surrounding the opening 190 of the hollow, three-dimensional gripping element body 111 should be parallel to the ground. When the extension pole is held vertical, the plane containing the peripheral rim 40 surrounding the opening 190 of the hollow, three-dimensional gripping element body 111 should be parallel to the ground.

To use the present invention 1, a user grasps the end of the extension pole 18 in one hand and holds the semi-annular collar in the other hand. The user positions the gripping element 11, 111 over a lightbulb of the appropriate Bulb Type and lowers it until the plurality of flexible, tactile members 31, 32, 33 are in contact with the lightbulb 2. The downward force supplied by the mass of the gripping element 11, 111 and the discrete weight 12, 112 allows the lightbulb to force the flexible, tactile members 31, 32, 33 apart. This is accomplished by having gravity pull the weight-and-gripping-element assembly 11, 111, 12, 112 downward while the lightbulb presses the plurality of flexible, tactile members outward relative to one another. When the weight-and-gripping-element assembly 11, 111, 12, 112 is fitted over a lightbulb 2, the flexible, tactile members 31, 32, 33 and dimples 141 on the inner surface of the gripping element 11, 111 provide sufficient friction that lightbulb 2 may be rotated at the same angular rate as the extension pole 18, when the extension pole 18 is rotated.

When the device 1 is properly seated, a lightbulb 2 may be removed from a socket by rotating the extension pole 18 in a counter-clockwise direction. When the extension pole 18 is rotated, the gripping element 11, 111 rotates at the same rate as the extension pole 18, without slippage. Likewise, a lightbulb 2 may be placed in a socket by placing the lightbulb into the gripping element 11, 111, lowering the gripping element 11, 111 over a socket, engaging the lightbulb 2 base 3 into the socket, and rotating the extension pole 18 in a clockwise direction until the lightbulb 2 is fully engaged in the socket. A user may remove a lightbulb 2 from the gripping element 11, 111 by pulling it in a direction away from the gripping element 11, 111.

We claim:

1. A device for installing and removing partially obstructed, upward-facing lightbulbs comprising:

a gripping element comprised of a hollow, three-dimensional gripping element body, having an outer surface, an inner surface, a top surface, an opening, and a peripheral rim surrounding the opening; and a plurality of flexible, tactile members, each flexible, tactile member having a concave inner surface, a convex outer surface, an edge, a base, a tip, and a dimple;

an extension pole having two ends and being continuously extensible between a fully compacted length and a fully extended length;

a semi-annular collar fitted about an outer diameter of a portion of the extension pole;

a flexible rotary shaft connected at a first end to a first end of the extension pole and connected at a second end to the gripping element;

a discrete weight in proximity with the gripping element, the discrete weight having a cylindrical inner diameter through which the flexible rotary shaft extends; and a silicon tube, bisected by a collar, interposed between the cylindrical inner diameter of the discrete weight and the flexible rotary shaft;

wherein the flexible rotary shaft is configured so that, when the extension pole is held horizontal, the peripheral rim is parallel to the ground and when the extension pole is held vertical, the peripheral rim is parallel to the ground;

wherein, when the semi-annular collar is held in a non-rotational manner, the extension pole may be rotated at an angular rate, causing the flexible rotary shaft and the gripping element to rotate at the same angular rate as the pole; and wherein, when the extension pole is rotated, the gripping element rotates at the same rate, without slippage.

2. The device for installing and removing partially obstructed, upward-facing lightbulbs of claim 1, further comprising an adapter, interposed between the extension pole and the flexible rotary shaft;

wherein the first end of the extension pole has a threaded termination and the adapter has a threaded receptacle to receive the threaded termination at the first end of the extension pole;

wherein the flexible rotary shaft is attached to the adapter; and wherein, when the extension pole is rotated at the angular rate, the adapter and flexible rotary shaft rotate at the same angular rate.

3. The device for installing and removing partially obstructed, upward-facing lightbulbs of claim 1, wherein the hollow, three-dimensional gripping element body is fabricated from at least one of Thermoplastic Polyurethane ("TPU"), Thermoplastic copolyester ("TPC"), Acrylonitrile Butadiene Styrene ("ABS"), High Density Poly Ethylene ("HDPE"), Low Density Poly Ethylene ("LDPE"), Polypropylene ("PP"), Polyethylene Terephthalate ("PET"), and thermoplastic elastomer.

4. The device for installing and removing partially obstructed, upward-facing lightbulbs of claim 3, wherein the base of each of the plurality of flexible, tactile members is a rectangular prism;

wherein a transition line separates the base from the concave inner surface of each of the plurality of flexible, tactile members;

wherein each of the plurality of flexible, tactile members has an angle of curvature, a radius of curvature, and a height;

wherein the angle of curvature is determined by extending a first line orthogonal to the edge of the flexible, tactile member at the transition line between the base and the concave inner surface and a second line orthogonal to the edge at the tip, which is aimed at the first line, until the first and the second line intersect; wherein the first line and the second line are constrained to be the same length; and wherein the radius of curvature is the length of the two lines.

5. The device for installing and removing partially obstructed, upward-facing lightbulbs of claim 4, wherein lightbulb type is defined as a shape, a diameter, and a base of the lightbulb; and wherein the height, radius of curvature, and angle of curvature of each of the equal plurality of flexible, tactile members are configured to make a force fit with a defined lightbulb type when the defined lightbulb type is inserted into the hollow, three-dimensional gripping element body.

6. The device for installing and removing partially obstructed, upward-facing lightbulbs of claim 5, wherein the inner surface of the tip of each flexible, tactile member of the gripping element has a protruding dimple.

7. The device for installing and removing partially obstructed, upward-facing lightbulbs of claim 6, wherein the flexible, tactile members are fabricated from at least one of polylactic acid ("PLA") or TPU.

8. The device for installing and removing partially obstructed, upward-facing lightbulbs of claim 7, where there are three flexible, tactile members.

9. The device for installing and removing partially obstructed, upward-facing lightbulbs of claim 7, where the flexible, tactile members are removable.

10. The device for installing and removing partially obstructed, upward-facing lightbulbs of claim 9, wherein the base of each of the plurality of flexible, tactile members fits into a corresponding slot in the peripheral rim.

11. The device for installing and removing partially obstructed, upward-facing lightbulbs of claim 7, wherein, extending from the outer surface near the tip of each flexible, tactile member is a counterbalance.

12. The device for installing and removing partially obstructed, upward-facing lightbulbs of claim 7, wherein when the device is lowered over a lightbulb matching the defined lightbulb type, the combined mass of the weight and gripping element are sufficient to seat the device over the lightbulb by having the lightbulb separate the plurality of flexible, tactile members so that the lightbulb fits between the plurality of flexible, tactile members.

13. The device for installing and removing partially obstructed, upward-facing lightbulbs in claim 12, wherein when the device is seated, the flexible, tactile members provide sufficient friction that the lightbulb may be rotated at the same angular rate as the extension pole, when the extension pole is rotated; and wherein the lightbulb may be removed from a socket by rotating the extension pole in a counter-clockwise direction.

14. The device for installing and removing partially obstructed, upward-facing lightbulbs in claim 7, wherein the device may be used to install a lightbulb matching the defined lightbulb type into an empty socket, by placing the lightbulb into the gripping element, lowering the gripping element over the empty socket, engaging a lightbulb base into the socket, and rotating the extension pole in a clockwise direction until the lightbulb base is fully engaged in the socket.

* * * * *